(12) United States Patent
Verma (10) Patent No.: US 9,537,854 B2
(45) Date of Patent: Jan. 3, 2017

(54) TRANSMITTING ENCODED DIGITAL CERTIFICATE DATA TO CERTIFICATE AUTHORITY USING MOBILE DEVICE

(71) Applicant: SYMANTEC Corporation, Mountain View, CA (US)

(72) Inventor: Ishita Verma, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/256,705

(22) Filed: Apr. 18, 2014

(65) Prior Publication Data

US 2015/0304309 A1    Oct. 22, 2015

(51) Int. Cl.
  *H04L 29/06*    (2006.01)
  *H04L 9/32*     (2006.01)

(52) U.S. Cl.
  CPC ........... *H04L 63/0823* (2013.01); *H04L 9/321* (2013.01); *H04L 9/3263* (2013.01); *H04L 63/029* (2013.01); *H04L 63/18* (2013.01)

(58) Field of Classification Search
  CPC ......... H04L 9/3263; H04L 63/18; H04L 9/321
  See application file for complete search history.

(56) References Cited

U.S. PATENT DOCUMENTS

| | | | |
|---|---|---|---|
| 2004/0068470 A1* | 4/2004 | Klyne | G06Q 20/12 705/50 |
| 2004/0255037 A1* | 12/2004 | Corvari | H04L 63/0823 709/229 |
| 2006/0080738 A1 | 4/2006 | Bezilla | |
| 2007/0234055 A1* | 10/2007 | Ohara | G06F 21/33 713/170 |
| 2008/0022103 A1* | 1/2008 | Brown | H04L 9/3226 713/175 |
| 2012/0041823 A1* | 2/2012 | Khan | G06Q 30/0267 705/14.64 |
| 2012/0159149 A1* | 6/2012 | Martin | H04L 63/0823 713/151 |
| 2013/0263211 A1* | 10/2013 | Neuman | H04L 63/08 726/1 |

(Continued)

FOREIGN PATENT DOCUMENTS

JP    2008099058 A    *    4/2008

OTHER PUBLICATIONS

Firewall Rules for Active Directory Certificate Services; http://blogs.technet.com/b/pki/archive/2010/06/25/firewall-roles-for-active-directory-certificate-services.aspx; Jun. 25, 2010.*

(Continued)

*Primary Examiner* — James Turchen
(74) *Attorney, Agent, or Firm* — Patterson + Sheridan, LLP (57) ABSTRACT

Techniques are disclosed for managing a digital certificate enrollment process. A certificate assistant on a server is configured to encode certificate enrollment data in a barcode graphic, such as a quick response (QR) code. A mobile phone application can then scan the barcode graphic using a camera to recover and transmit the enrollment data to a certificate authority. Doing so allows a system administrator (or other user) to complete the certificate enrollment process in cases where the server is blocked from connecting to a certificate authority (CA) directly, e.g., because the server is behind a firewall blocking any outbound network connections from being initiated.

9 Claims, 7 Drawing Sheets

(56) References Cited

U.S. PATENT DOCUMENTS

| | | | | |
|---|---|---|---|---|
| 2014/0108785 A1* | 4/2014 | Lindteigen | ......... | H04L 63/0823 |
| | | | | 713/156 |
| 2014/0108810 A1* | 4/2014 | Chenna | ................ | H04L 9/321 |
| | | | | 713/179 |
| 2014/0229735 A1* | 8/2014 | Holleis | ................ | H04L 63/18 |
| | | | | 713/171 |
| 2014/0282961 A1* | 9/2014 | Dorfman | ............ | H04L 63/0823 |
| | | | | 726/7 |
| 2014/0376405 A1* | 12/2014 | Erickson | .......... | H04W 52/0212 |
| | | | | 370/254 |
| 2015/0089215 A1* | 3/2015 | Hattori | ................ | H04L 9/321 |
| | | | | 713/156 |
| 2015/0381624 A1* | 12/2015 | Reiter | ............... | H04L 63/0428 |
| | | | | 713/168 |
| 2016/0043867 A1* | 2/2016 | Bonsignore | ............ | G06F 21/34 |
| | | | | 713/168 |

OTHER PUBLICATIONS

SSL Certificate Installation in Microsoft IIS 7; https://web.archive.org/web/2008121900047/http://www.digicert.com/ssl-certificate-installation-microsoft-iis-7.htm; Retrieved from Wayback machine on Apr. 16, 2015; Dec. 19, 2008.*
Leveraging Public-key-based Authentication for the Internet of Things; Hossein Shafagh; Jul. 19, 2013.*
Secure QR Login; retrieved from https://web.archive.org/web/20131003055846/https://www.grc.com/sqrl/sqrl.htm; dated Oct. 3, 2013.*
RSA Security Analytics Data Discovery—DLP—EMC, Jan. 23, 2014.

* cited by examiner

TRANSMITTING ENCODED DIGITAL CERTIFICATE DATA TO CERTIFICATE AUTHORITY USING MOBILE DEVICE

BACKGROUND

Field

Embodiments of the invention generally relate to techniques for managing a digital certificate enrollment process. More specifically, embodiments presented herein provide techniques for exchanging encoded digital certificate data between a server and a certificate authority using barcode graphics and a mobile device.

Description of the Related Art

Providing secure communications and protecting sensitive data is a well known issue in a broad variety of contexts. For example, it is common for computer servers to use digital certificates to associate a server with a network domain. In such cases, clients use information contained in a certificate to verify the identity of a server and to enable secure communications with that server. Other applications use digital certificates to help manage encrypted data. For example, a database may be configured with a digital certificate specifying a key used to encrypt data (or used to create encryption keys) stored by the database.

More generally, digital certificates and public key infrastructure (PKI) techniques are used to create, distribute, and manage cryptographic keys used in a variety of contexts. Typically, digital certificates are issued by a certificate authority (CA) after a requesting party completes an enrollment process. As part of the enrollment process, the requesting party provides the CA with a public key to be named in the certificate and with information used to verify the identity of the requesting party (and authority to request the certificate). The public key corresponds to a private key that needs to be maintained securely by the requesting party. The key pair (i.e., the public and private key) is usually generated on the same computing system where the certificate will be installed. However, server systems are frequently unable to initiate an outbound network connection. For example, a server may be behind a network firewall that will block any attempts to initiate an outbound connection. In such cases, the party requesting a certificate needs to provide the certificate authority with a certificate signing request (CSR) but cannot create and send the CSR from the system where the key pair is generated or where the certificate will be installed.

SUMMARY

One embodiment presented herein includes a method for managing digital certificate enrollment data. This method may generally include generating, by operation of one or more computer processors, a public key corresponding to a private key stored on a server, where the server is blocked from establishing a network connection with a certificate authority. This method may also include generating at least a first encoding of the public key and rendering a display of the first encoding of the public key.

In a particular embodiment, this method may further include, prior to generating the first encoding of the public key, storing the public key in a certificate signing request (CSR) to be sent to the certificate authority as the certificate enrollment data. Further, the first encoding may be one or more quick response (QR) codes encoding the certificate signing request. In such a case, a mobile device configured with a camera recovers the CSR from the one or more QR codes and transmits the one or more QR codes to the certificate authority.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Embodiments presented herein provide techniques for managing a digital certificate enrollment process. In one embodiment, a certificate assistant on a server is configured to encode certificate enrollment data in a barcode graphic, such as a quick response (QR) code. For example, the certificate assistant may provide a software application installed on the server which can generate a key pair using a pseudo-random data source. Once generated, the certificate assistant may securely store the private key and generate a certificate signing request (CSR) containing the public key. Further, the certificate assistant may encode the CSR (or the public key) in one or more QR codes rendered on a display screen.

A mobile phone application can then scan the barcode graphic using a camera to recover and transmit the enrollment data to a certificate authority. Doing so allows a system administrator (or other user) to complete the certificate enrollment process in cases where the server is blocked from connecting to a certificate authority (CA) directly, e.g., because the server is behind a firewall blocking any outbound network connections from being initiated. Alternatively, the CSR could be encoded as an alphanumeric code (e.g., a .PEM encoding) read by the mobile application using the camera and recovered using optical character recognition (OCR) techniques. Once received, the CA can correlate the CSR with a pending certificate request and issue the digital certificate using the enrollment data.

As described in detail below, using a mobile app and a QR code (or other barcode graphic) is an effective mechanism to communicate certificate enrollment data to a CA. Further, this approach allows the certificate assistant to generate the private and public keys on the same system where the private key is going to be stored. Doing so is favored from a security standpoint, as it is preferable to not move a private key from one system to another. Further still, in cases where the keys are generated by tamper proof hardware used to store the private key on the server, it may be only system where the key pair can be generated.

Note, embodiments of the invention are described below using a server hosting one or more applications, including a certificate assistant, as system used to create certificate enrollment data encoded in a QR code. One of ordinary skill in the art will recognize that embodiments of the invention may be adapted to work with a variety of computing devices used to securely communicate, process, or store sensitive data or which can be provisioned with a digital certificate. For example, embodiments may be used with virtualized systems and infrastructure, stand-alone computing appliances, network devices, data storage devices, etc., which use digital certificates as a security mechanism. Similarly, embodiments may be adapted to use a variety of other barcode encoding schemes, as well as to use alphanumeric text recovered using OCR.

Figure 1:
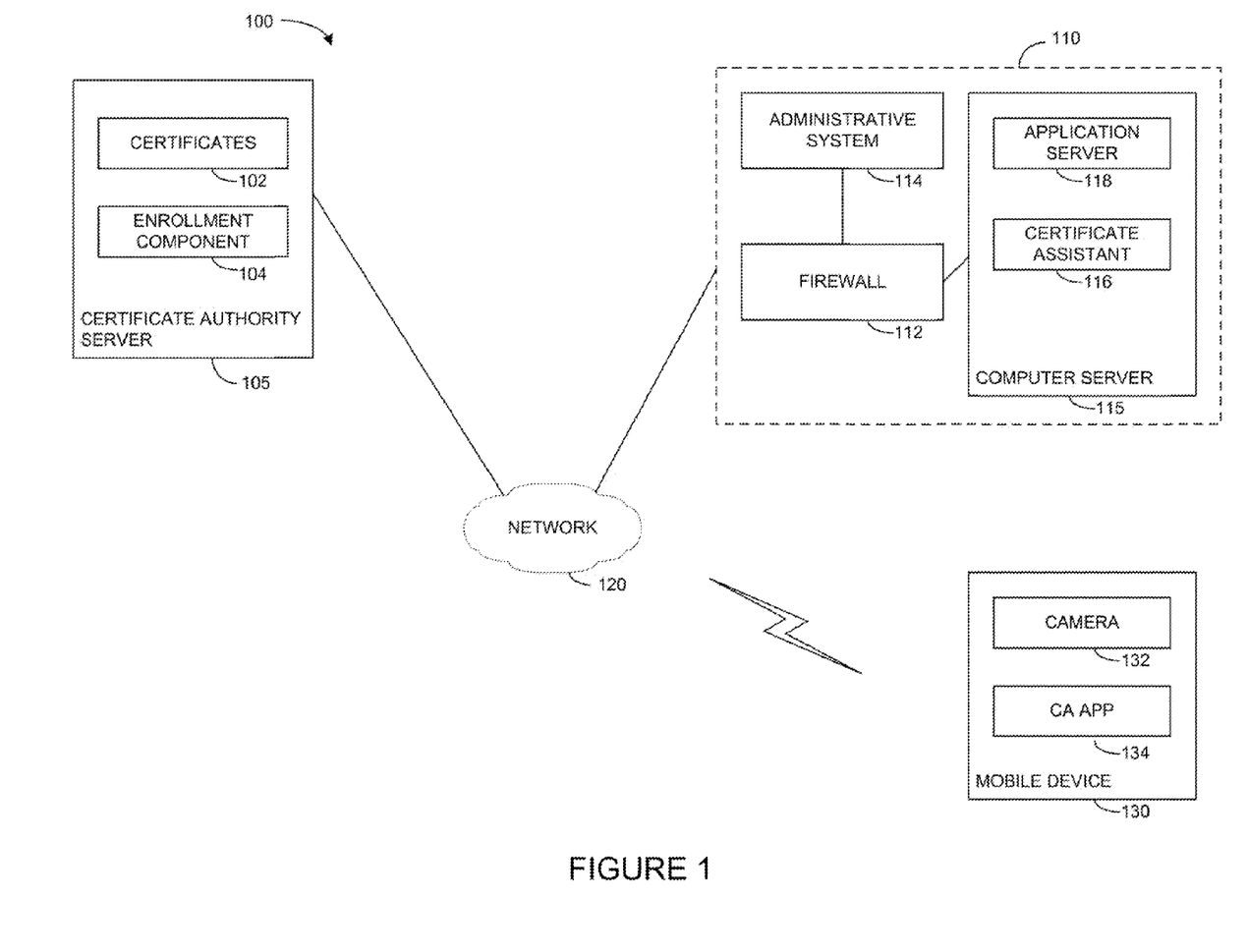
FIG. 1 illustrates an example computing environment, according to one embodiment.

FIG. 1 illustrates an example computing environment 100, according to one embodiment. As shown, the computing environment 100 includes a certificate authority (CA) 105, an enterprise computing environment 110, and a mobile device 130, each connected to a network 120 (e.g., the internet). The enterprise computing environment 110 includes an administrative system 114, firewall 112, and a computer server 115. The administrative system 114 provides a computer used to communicate with an enrollment component 104 of the CA. For example, the enrollment component 104 may be implemented using a web server, application server and a database. The administrator may access the enrollment component 104 to request a digital certificate for computer server 115. Such a request may identify a domain name to associate with the computer server 115, as well as specify a collection of properties about the certificate and information used to confirm the identify and authority of the user requesting a new digital certificate.

After providing this information, the certificate assistant 116 may generate a private/public key pair. The private key is stored on the computer server 155, e.g., in tamper-proof hardware. The certificate assistant 116 may also generate a certificate signing request (CSR), which includes the public key. For example, CSRs are frequently stored as file using the .PEM format. Of course, other formats could be used. Once stored, the administrator needs to send the CSR to the certificate authority 105, which then issues certificate 102. However, for this example, assume a firewall 112 will block any attempt by the certificate assistant 116 to initiate a network connection with the enrollment component 104 directly. This may occur where the computer server 115 is configured with an application server 118, which is used to respond to requests from external clients. In such a case, the firewall 112 would allow inbound connections to be established, but block outbound connections from being established.

In one embodiment, the certificate assistant 116 instead generates one or more QR code displayed on a monitor. The user requesting the new digital certificate can then launch a CA app 134 on a mobile device 130. In turn, the app 134 scans the QR code using camera 130 to recover the CSR. Once scanned, the CA app 134 sends the CSR to the enrollment component 104 of the CA 105. The CA 105 can then issue digital certificate 102. Note, in an alternative embodiment, the certificate assistant could encode the public key generated on the computer server 115 in a QR code. In such a case, the CA app 134 on the mobile device 130 may generate a CSR storing the public key and forward it to the enrollment component.

Figure 2:
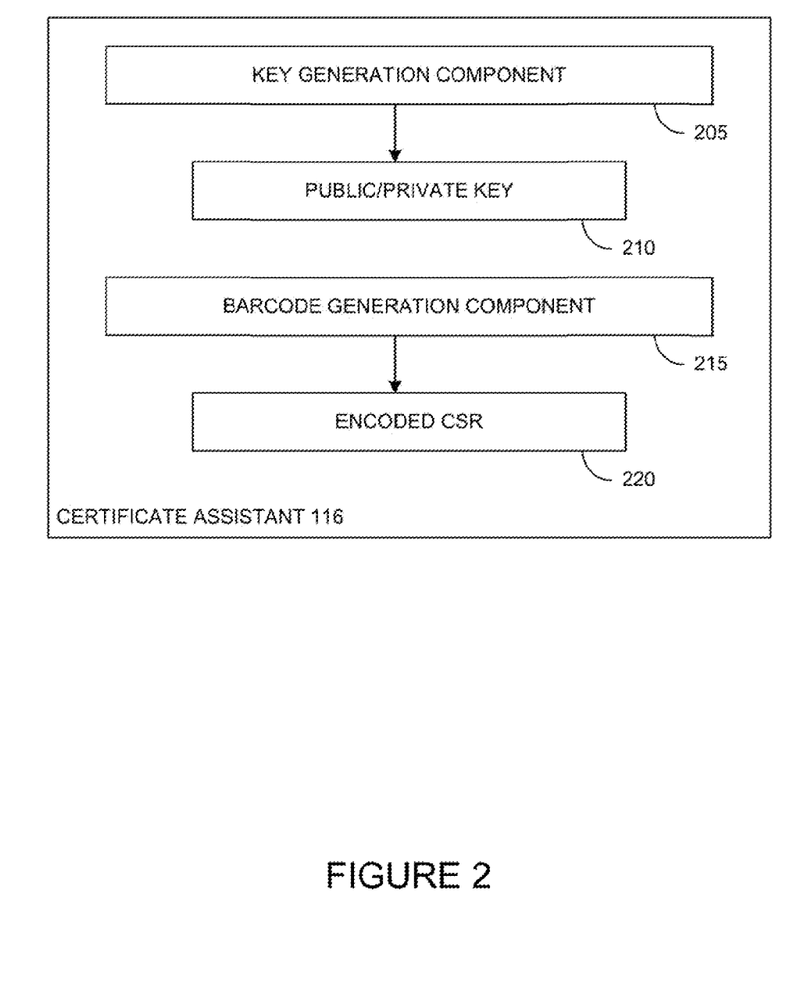
FIG. 2 illustrates components of an example certificate assistant, according to one embodiment.

FIG. 2 illustrates components of an example certificate assistant 116, according to one embodiment. As shown, the certificate assistant 116 includes a key generation component 205 and a barcode generation component 215. The key generation component includes one or more software applications used to generate a public/private key pair 210. For example, the key generation component 205 may access a pseudo-random data source to generate the public/private keys 210. Any suitable public key algorithm may be used, including, e.g., the RSA end elliptic curve algorithms. Once generated, the private key may be stored in a secure manner.

Further, the public key may be stored in a certificate signing request, e.g., a .PEM file. In one embodiment, the barcode generation component 215 creates an encoded CSR 220, such as one or more QR-codes. The resulting QR-codes may be rendered on a monitor. Once recovered using a camera on a mobile device, the CSR can be transmitted to a certificate authority. As noted above, this approach allows the CSR to be transmitted to the certificate authority in cases where the system which generated the private/public key pair cannot initiate a connection to the certificate authority. Further, once received, the CA can correlate the information transmitted from the mobile device with a pending certificate request.

Figure 3:
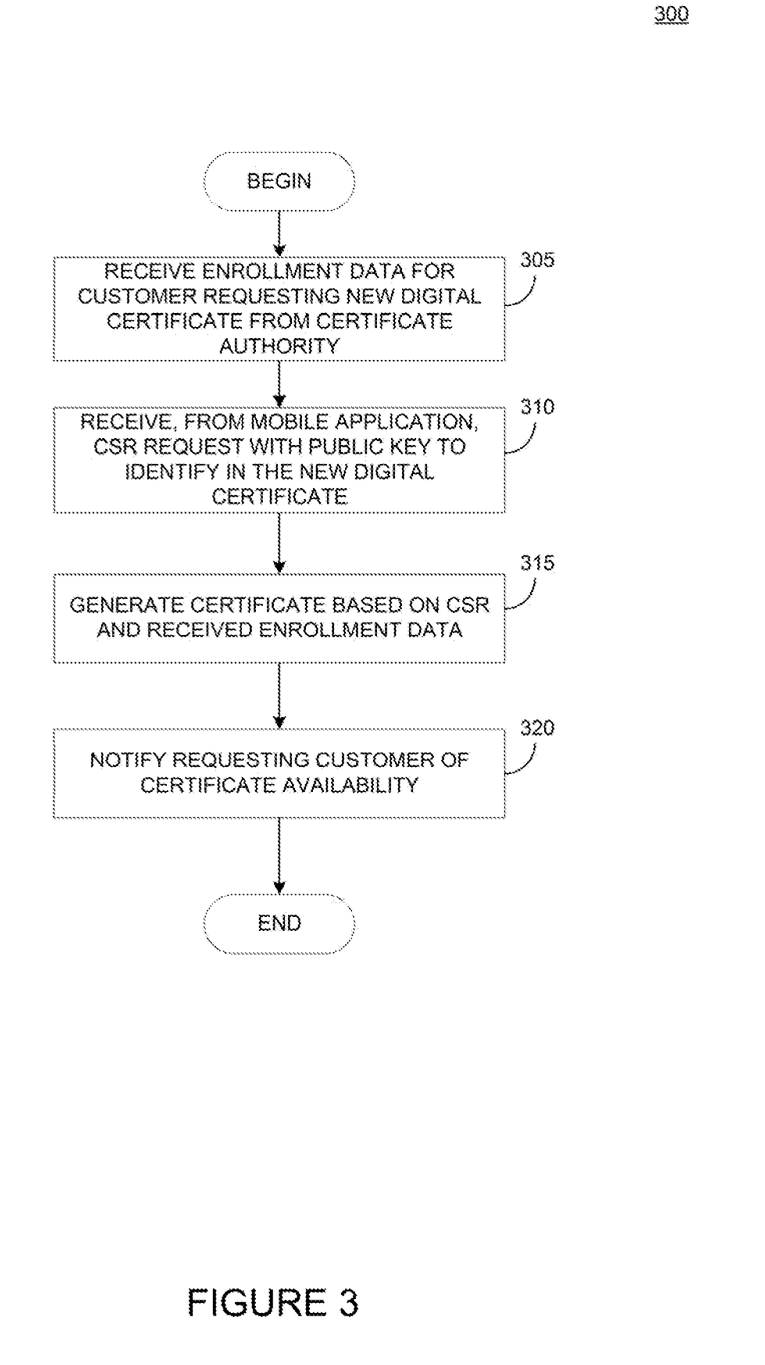
FIG. 3 illustrates a method for a certificate authority to obtain enrollment data, according to one embodiment.

FIG. 3 illustrates a method for a certificate authority to obtain enrollment data, according to one embodiment. As shown the method 300 begins at step 305, where a certificate authority receives enrollment data from a user requesting a new digital certificate. For example, a user may interact with CA's retail website to provide identify and verification information, domain information, as well as fees for a new certificate request.

At step 310, the CA receives a certificate signing request (CSR) which stores a public key to be named in the certificate requested at step 305. In one embodiment, the CA receives the CSR from a mobile application, which itself, recovered the CSR from one or more QR codes displayed on the monitor of the server which generated the public key. The CA then correlates the CSR received at step 310 with the certificate enrollment data received at step 305. At step, 315, the CA generates the requested certificate. Typically, the CA digitally signs the public key in the CSR using the private key of the CA. Relying parties can then verify the information in the certificate, by verifying the signature of the CA listed in the certificate.

At step 320, the CA notifies the requesting party that the certificate has been issued. For example, the CA may send an email message to the requesting user with the certificate included as an attachment. Alternatively, the CA may send a message with a network location (e.g., a HTTP link) from where the certificate may be retrieved.

Figure 4:
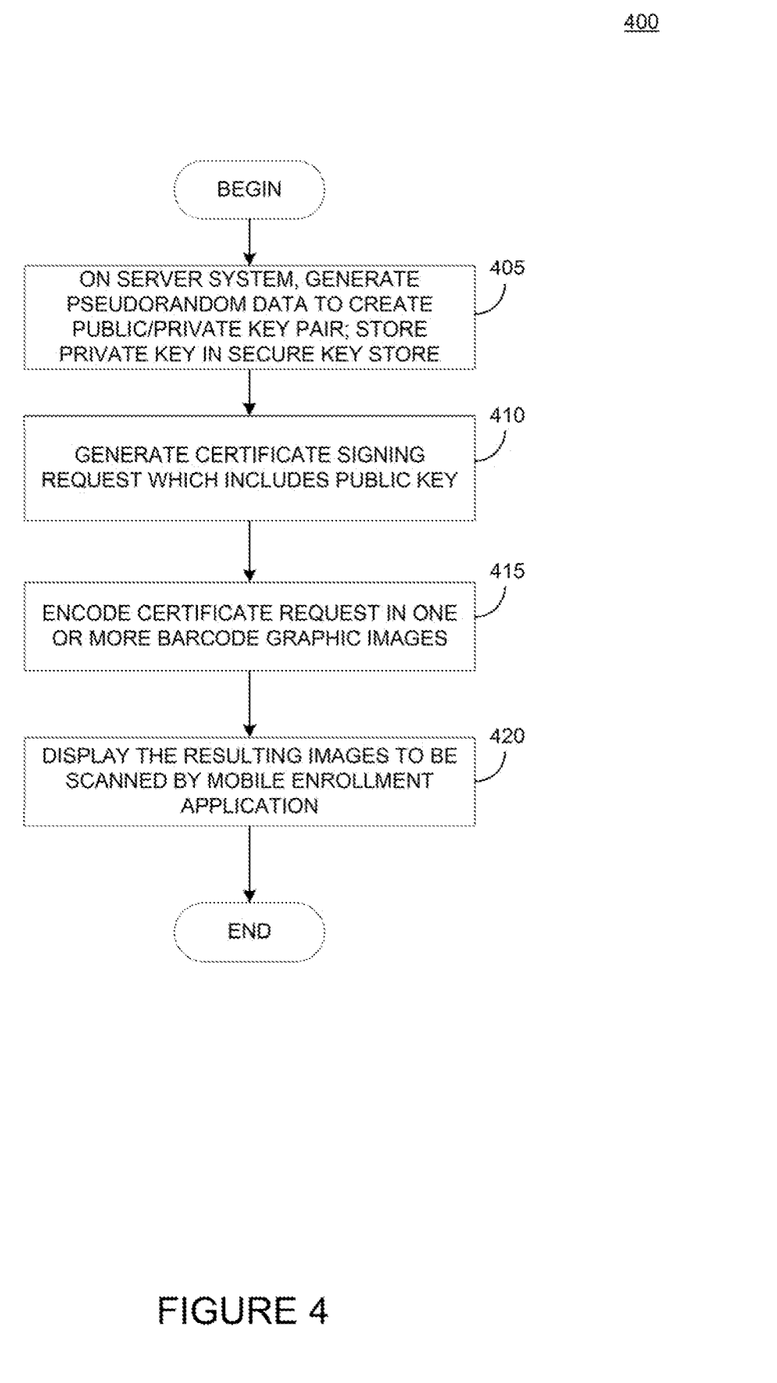
FIG. 4 illustrates a method for generating and encoding a public key and certificate signing request, according to one embodiment.

FIG. 4 illustrates a method 400 for generating and encoding a public key and certificate signing request, according to one embodiment. Method 400 generally corresponds to the actions of the certificate assistant 116 illustrated in FIGS. 1 and 2. As shown, the method 400 begins at step 405 where the certificate assistant installed on a server generates a public/private key pair using data from a random or pseudo-random source. The private key is then stored on the server in a secure manner, e.g., in a tamper-proof hardware module. Alternatively, the key pair itself could be generated in a tamper-proof hardware module. In such a case, the public key may be exported from the hardware module. In other cases, the private key may be stored in a secure key store maintained by a server operating system.

At step 410, the certificate assistant generates a certificate signing request (CSR). As noted, the assistant may store the CSR in a .PEM file. At step 415, the CSR may be encoded in one or more barcode images, such as one or more QR-codes. Once generated, the QR-codes may be rendered on a display monitor, scanned by a camera on a mobile phone and transmitted to a CA.

Figure 5:
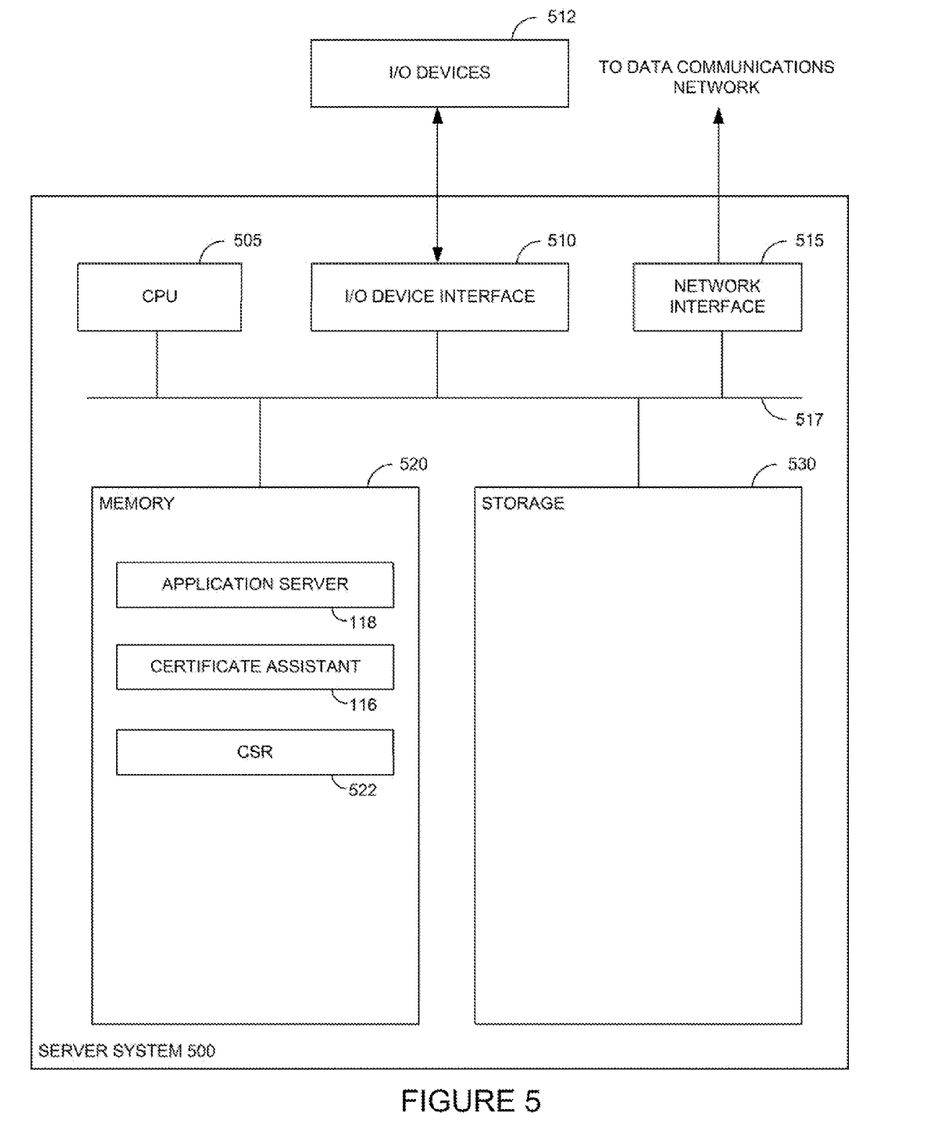
FIG. 5 illustrates an example computing system configured with a certificate assistant used to generate and encode a public key and certificate signing request, according to one embodiment.

FIG. 5 illustrates an example computing system configured with a certificate assistant used to generate and encode a public key and certificate signing request, according to one embodiment. As shown, the computing system 500 includes, without limitation, a central processing unit (CPU) 505, a network interface 515, a network interface 515, a memory 520, and storage 530, each connected to a bus 517. The computing system 500 may also include an I/O device interface 510 connecting I/O devices 512 (e.g., keyboard, display and mouse devices) to the computing system 500. Further, in context of this disclosure, the computing elements shown in computing system 500 may correspond to a physical computing system (e.g., a system in a data center) or may be a virtual computing instance executing within a computing cloud.

The CPU 505 retrieves and executes programming instructions stored in the memory 520 as well as stores and retrieves application data residing in the memory 530. The interconnect 517 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, optical storage, network attached storage (NAS), or a storage area-network (SAN).

Illustratively, the memory 520 includes the application server 118, certificate assistant 116, and a certificate signing request (CSR). As described above, the application server 118 may be configured to respond to client requests (e.g., in the case of a web-server, to respond to HTTP requests for HTML content). The certificate assistant 116 is configured to generate private/public key, store the private key and generate a certificate signing request. In one embodiment, the certificate assistant 116 generates one or more QR codes encoding the CSR. The one or more QR codes are displayed on a monitor, allowing an administrator to scan the codes using a mobile phone, app, and camera in order to transmit the CSR to a certificate authority.

Figure 6:
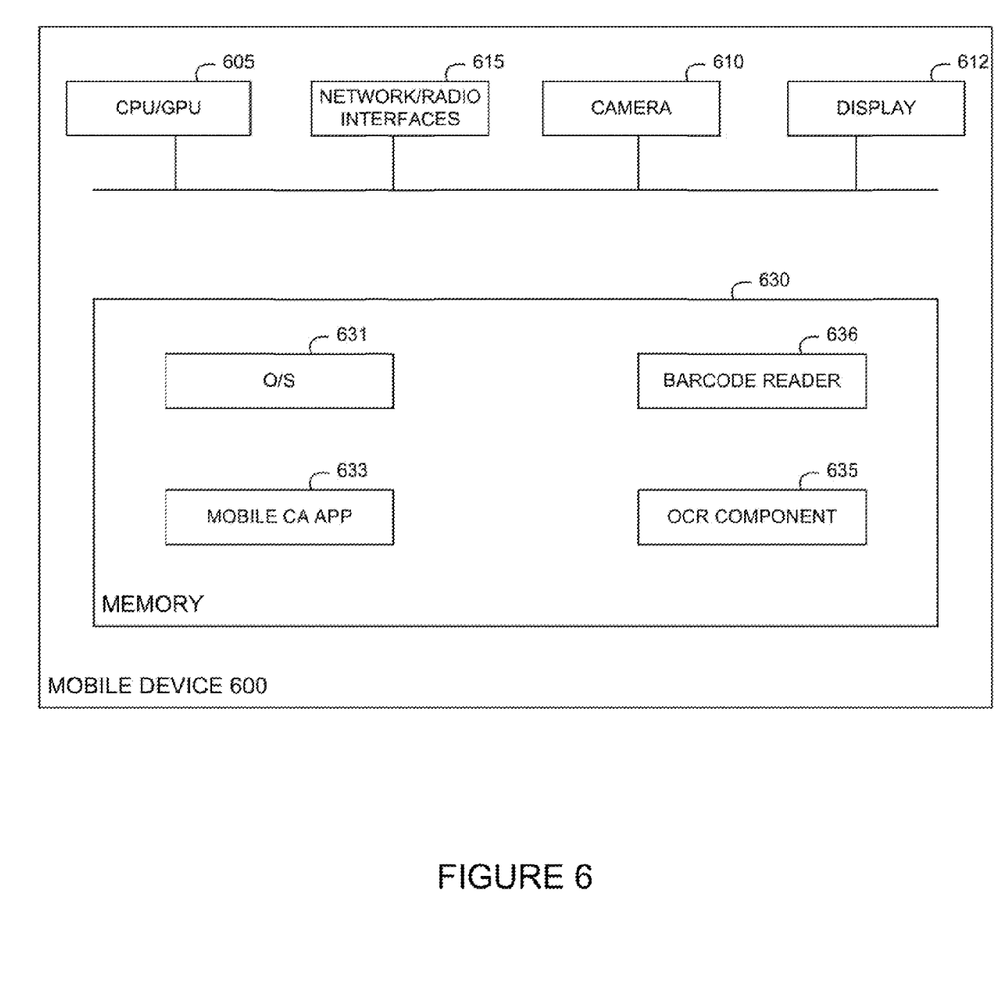
FIG. 6 illustrates an example mobile device used to provide a certificate authority with enrollment data from a server, according to one embodiment.

FIG. 6 illustrates an example mobile device 600 used to provide a certificate authority with enrollment data from a server, according to one embodiment. In this example, device 600 is used to be representative of a mobile telephone (commonly referred to as a Smartphone) with a touch sensitive display 612 and a camera 610. Of course, embodiments of the invention may be adapted for use with a variety of computing devices, including PDAs, tablet computers, and other computing devices having a display screen and camera.

As shown, the handheld device 600 includes, without limitation, a central processing unit and graphics processing unit (CPU/GPU) 605, network/radio interfaces 615, an interconnect 620, and a memory 630. Of course, an actual mobile device will include a variety of additional hardware components.

The CPU/GPU 605 retrieves and executes programming instructions stored in the memory 630. Similarly, the CPU/GPU 605 stores and retrieves application data residing in the memory 630. The interconnect 620 is used to transmit instructions and data between the CPU/GPU, storage 630, network interfaces 615, and memory 630. CPU/GPU 605 is included to be representative of a single CPU, multiple CPUs, a single CPU having multiple processing cores, and the like. And the memory 630 is generally included to be representative of memory and storage on a mobile device, e.g., DDR and flash memory spaces.

Illustratively, the memory 630 includes a mobile operating system (O/S) 631, a mobile certificate authority (CA) app 633, a QR code reader 636, and an OCR component 635. The mobile O/S 631 provides software configured to control the execution of application programs on the mobile device 600. The CA app 633 generally provides a software application configured to transmit a certificate signing request (CSR) to a certificate authority. To do so, the barcode reader 636 accesses the camera 610 in order to read a QR code presented on server display monitor. As noted, the QR code may store the certificate signing request (CSR) to be transmitted to the CA. Alternatively, the QR code may store a public key to be named in a CSR. In such a case, the CA app 633 may generate the CSR storing the public key recovered from the QR code. In another embodiment, the certificate assistant generates an alphanumeric encoding of the CSR. In such a case, the content of the CSR can be captured using camera 610 and recovered using OCR component 635. Once the certificate enrollment data is received, the CA app transmits it to the CA, allowing a certificate to be issued.

Figure 7:
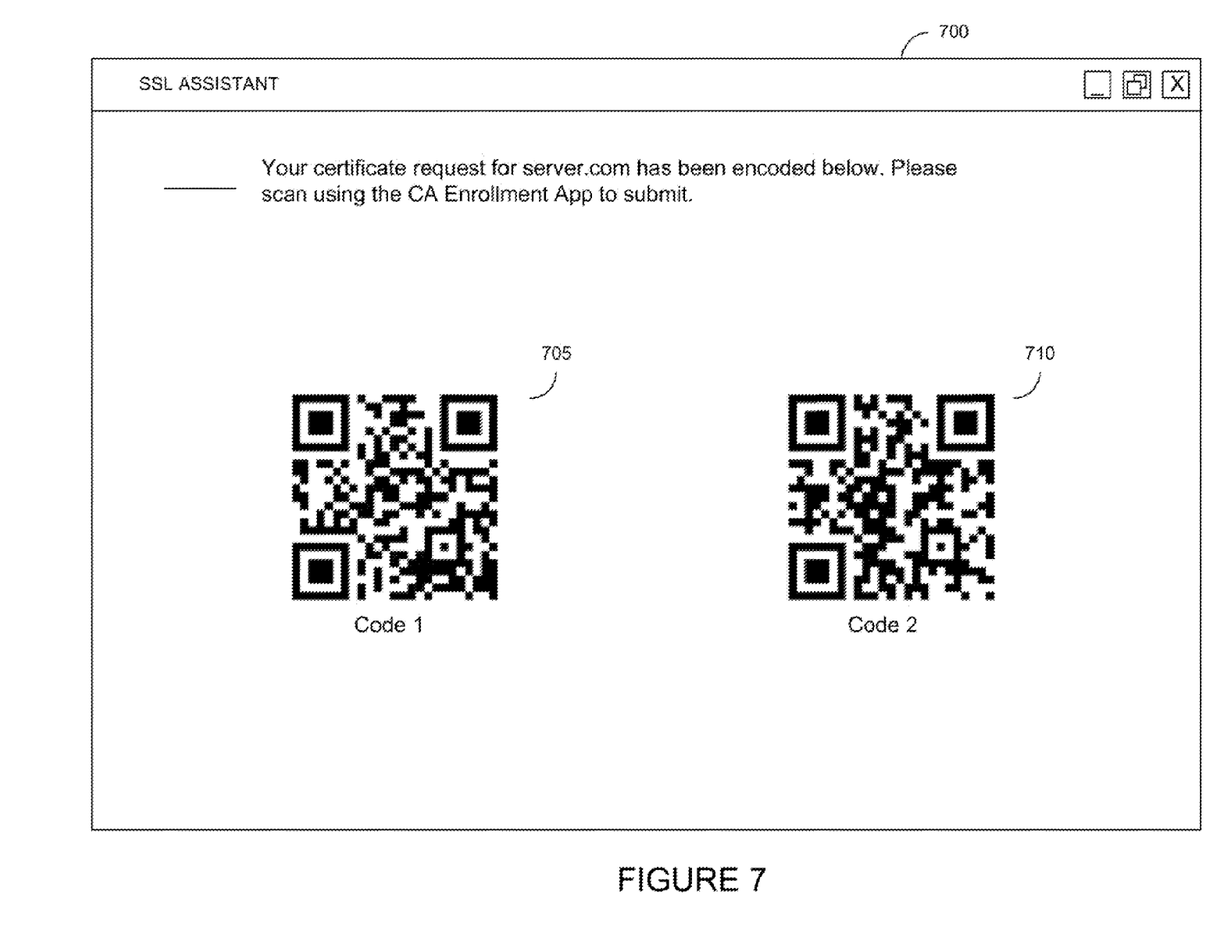
FIG. 7 illustrates an example graphical interface showing a pair of barcode graphics encoding certificate enrollment data, according to one embodiment.

FIG. 7 illustrates an example graphical interface 700 showing a pair of barcode graphics used to encode certificate enrollment data, according to one embodiment. In this example, a user is presumed to have interacted with the certificate assistant as described above to generate a public and private key pair. Additionally, the certificate assistant has generated a CSR and encoded it within two QR codes. Note, the number of QR codes needed to embed the CSR may vary depending on the resolution of the camera on a mobile phone and the amount of data to be encoded. If the amount of data needed for a given CSR exceeds the data-carrying capacity of the QR code, then the certificate assistant divides the CSR into as many individual QR codes (or other barcode graphic representation) as needed.

Advantageously, as described above, a certificate assistant on a server is configured to encode certificate enrollment data in a barcode graphic, such as a quick response (QR) code. A mobile phone application can then scan the barcode graphic using a camera to recover and transmit the enrollment data to a certificate authority. Doing so allows a system administrator (or other user) to complete the certificate enrollment process in cases where the server is blocked from connecting to a certificate authority (CA) directly, e.g., because the server is behind a firewall blocking any outbound network connections from being initiated.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Users can access any of the computing resources that reside in the cloud at any time, from anywhere across the Internet. For example, in context of this disclosure, a certificate assistant may execute on a virtual server in a computing cloud to create a public/private key pair and encode the pubic key in a barcode graphic. Doing so could allow a remote system administrator to generate a CSR on the virtual sever and transmit a CSR to a certificate authority in cases where the certificate assistant on the virtual server is blocked from establishing a network connection to an issuing CA.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing digital certificate enrollment data, the method comprising:
   generating, by operation of one or more computer processors, a public key corresponding to a private key stored on a server, wherein the server is blocked from establishing a network connection with a certificate authority;
   storing the public key in a certificate signing request (CSR) to be sent to the certificate authority by a mobile device as the certificate enrollment data;
   generating at least a first encoding of the CSR storing the public key, wherein the first encoding includes one or more quick response (QR) codes encoding the certificate signing request; and
   rendering a display of the first encoding of the CSR storing the public key, wherein the mobile device is configured to read the rendered display of the first encoding and wherein the mobile device includes a camera configured recover the CSR from first encoding and wherein the mobile device transmits the CSR to the certificate authority.

2. The method of claim 1, wherein the certificate authority correlates the CSR with a pending certificate request.

3. The method of claim 1, wherein the first encoding is an alphanumeric encoding recovered using a mobile device configured with optical character recognition (OCR) applications.

4. A computer-implemented method for managing digital certificate enrollment data, the method comprising:
   generating, by operation of one or more computer processors, a public key corresponding to a private key stored on a server, wherein the server is blocked from establishing a network connection with a certificate authority;

generating at least a first encoding of the public key; and
rendering a display of the first encoding of the public key, wherein a mobile device is configured to read the rendered display of the first encoding, wherein the mobile device includes a camera configured recover the first public key from first encoding and wherein the first encoding is one or more quick response (QR) codes recovered using the mobile device and wherein the mobile device is configured to generate a certificate signing request (CSR) to be sent to the certificate authority as the certificate enrollment data.

5. A non-transitory computer-readable storage medium storing instructions, which, when executed on a processor, performs an operation for managing digital certificate enrollment data, the operation comprising:
  generating, by operation of one or more computer processors, a public key corresponding to a private key stored on a server, wherein the server is blocked from establishing a network connection with a certificate authority;
  storing the public key in a certificate signing request (CSR) to be sent to the certificate authority by a mobile device as the certificate enrollment data;
  generating at least a first encoding of the CSR storing the public key, wherein the first encoding includes one or more quick response (QR) codes encoding the certificate signing request; and
  rendering a display of the first encoding of the CSR storing the public key, wherein the mobile device is configured to read the rendered display of the first encoding and wherein the mobile device includes a camera configured recover the CSR from first encoding and wherein the mobile device transmits the CSR to the certificate authority.

6. The computer-readable storage medium of claim 5, wherein the certificate authority correlates the CSR with a pending certificate request.

7. The computer-readable storage medium of claim 5, wherein the first encoding is an alphanumeric encoding recovered using a mobile device configured with optical character recognition (OCR) applications.

8. A system, comprising:
  a processor; and
  a memory hosting an application, which, when executed on the processor, performs an operation for an operation for managing digital certificate enrollment data, the operation comprising:
    generating, by operation of one or more computer processors, a public key corresponding to a private key stored on a server, wherein the server is blocked from establishing a network connection with a certificate authority,
    storing the public key in a certificate signing request (CSR) to be sent to the certificate authority by a mobile device as the certificate enrollment data,
    generating at least a first encoding of the CSR storing the public key, wherein the first encoding includes one or more quick response (QR) codes encoding the certificate signing request, and
    rendering a display of the first encoding of the CSR storing the public key, wherein the mobile device is configured to read the rendered display of the first encoding and wherein the mobile device includes a camera configured recover the CSR from first encoding and wherein the mobile device transmits the CSR to the certificate authority.

9. The system of claim 8, wherein the certificate authority correlates the CSR with a pending certificate request.

* * * * *